US010863234B2

United States Patent
Jabara et al.

(10) Patent No.: US 10,863,234 B2
(45) Date of Patent: Dec. 8, 2020

(54) SYSTEM AND METHOD FOR SECURE APPLIANCE OPERATION

(71) Applicant: Mobilitie, LLC, Newport Beach, CA (US)

(72) Inventors: Gary Bernard Jabara, Newport Beach, CA (US); Shah J. Zeb, Irvine, CA (US); Lloyd Frederick Linder, Agoura Hills, CA (US)

(73) Assignee: Mobilitie, LLC, Newport Beach, CA (US)

( * ) Notice: Subject to any disclaimer, the term of this patent is extended or adjusted under 35 U.S.C. 154(b) by 217 days.

(21) Appl. No.: 15/948,913

(22) Filed: Apr. 9, 2018

(65) Prior Publication Data

US 2018/0227627 A1 Aug. 9, 2018

Related U.S. Application Data

(63) Continuation-in-part of application No. 14/862,781, filed on Sep. 23, 2015, which is a continuation of
(Continued)

(51) Int. Cl.
*H04W 60/00* (2009.01)
*H04N 21/2187* (2011.01)
(Continued)

(52) U.S. Cl.
CPC ... *H04N 21/43637* (2013.01); *H04L 63/0876* (2013.01); *H04N 21/2187* (2013.01);
(Continued)

(58) Field of Classification Search
CPC ......... H04N 21/43637; H04N 21/2187; H04N 21/2223; H04N 21/2541; H04N 21/25816;
(Continued)

(56) References Cited

U.S. PATENT DOCUMENTS 7,656,889 B2 2/2010 Jeon
9,001,837 B2 4/2015 Lam
(Continued)

FOREIGN PATENT DOCUMENTS

EP 3579494 A1 12/2019
KR 10-2017-0097143 A 8/2017
(Continued)

OTHER PUBLICATIONS

Extended European Search Report dated Jul. 19, 2019, issued in corresponding European Patent Application No. 19168022.2, filed Apr. 9, 2019, 9 pages.
(Continued)

*Primary Examiner* — Nathan J Flynn
*Assistant Examiner* — Caroline Somera
(74) *Attorney, Agent, or Firm* — Davis Wright Tremaine LLP; Michael J. Donohue

(57) ABSTRACT

Secure control of network appliances uses a central hub connected to a plurality of network appliances or multiple hubs in a short-range wireless mesh network. The central hub controls communication with the appliances and also includes a cellular link for communication with a cellular network. Only the central hub can communicate with the Internet via the cellular link. User equipment (UE) contains an application program that works in conjunction with the central hub to control the appliances. Commands generated by the UE are sent either directly to the central hub or via the mesh network. Upon receipt of an authenticated command, the central hub propagates commands via the short-range wireless mesh network to the intended network appliance either directly or via the mesh network.

15 Claims, 9 Drawing Sheets

US 10,863,234 B2
Page 2

Related U.S. Application Data application No. 13/363,943, filed on Feb. 1, 2012, now Pat. No. 9,179,296, which is a continuation-in-part of application No. 13/093,998, filed on Apr. 26, 2011, now Pat. No. 8,995,923, which is a continuation-in-part of application No. 12/958,296, filed on Dec. 1, 2010, now Pat. No. 9,077,564, which is a continuation-in-part of application No. 12/616,958, filed on Nov. 12, 2009, now Pat. No. 8,190,119, which is a continuation-in-part of application No. 12/397,225, filed on Mar. 3, 2009, now Pat. No. 7,970,351.

(51) Int. Cl.

| | | |
|---|---|---|
| *H04N 21/4367* | (2011.01) | |
| *H04W 8/18* | (2009.01) | |
| *H04W 4/021* | (2018.01) | |
| *H04W 76/11* | (2018.01) | |
| *H04W 12/12* | (2009.01) | |
| *H04W 4/70* | (2018.01) | |
| *H04W 4/80* | (2018.01) | |
| *H04N 21/4363* | (2011.01) | |
| *H04N 21/254* | (2011.01) | |
| *H04N 21/63* | (2011.01) | |
| *H04N 21/222* | (2011.01) | |
| *H04N 21/258* | (2011.01) | |
| *H04N 21/61* | (2011.01) | |
| *H04L 29/06* | (2006.01) | |
| *H04N 21/414* | (2011.01) | |
| *H04N 21/475* | (2011.01) | |
| *H04W 12/00* | (2009.01) | |
| *H04W 12/06* | (2009.01) | |
| *H04W 88/04* | (2009.01) | |
| *H04W 84/18* | (2009.01) | |
| *H04W 8/20* | (2009.01) | |
| *H04W 76/45* | (2018.01) | |

(52) U.S. Cl.
CPC ..... *H04N 21/2223* (2013.01); *H04N 21/2541* (2013.01); *H04N 21/25816* (2013.01); *H04N 21/41407* (2013.01); *H04N 21/4367* (2013.01); *H04N 21/4753* (2013.01); *H04N 21/6131* (2013.01); *H04N 21/632* (2013.01); *H04W 4/021* (2013.01); *H04W 4/70* (2018.02); *H04W 4/80* (2018.02); *H04W 8/18* (2013.01); *H04W 8/186* (2013.01); *H04W 12/001* (2019.01); *H04W 12/0609* (2019.01); *H04W 12/12* (2013.01); *H04W 60/00* (2013.01); *H04W 76/11* (2018.02); *H04W 8/205* (2013.01); *H04W 76/45* (2018.02); *H04W 84/18* (2013.01); *H04W 88/04* (2013.01)

(58) Field of Classification Search
CPC ......... H04N 21/41407; H04N 21/4367; H04N 21/4753; H04N 21/6131; H04N 21/632; H04W 4/70; H04W 4/80; H04W 4/021; H04W 76/11; H04W 12/001; H04W 12/06; H04W 12/12; H04W 8/18; H04W 8/186; H04W 8/205; H04W 60/00; H04W 76/46; H04W 84/18; H04W 88/04; H04L 63/0876
USPC ......................................................... 725/27
See application file for complete search history.

(56) References Cited

U.S. PATENT DOCUMENTS

| | | | |
|---|---|---|---|
| 2014/0159877 A1 | 6/2014 | Huang | |
| 2014/0362183 A1 | 12/2014 | Benyola | |
| 2014/0366050 A1 | 12/2014 | Hatambeiki | |
| 2015/0019736 A1 | 1/2015 | Imes | |
| 2015/0195100 A1 | 7/2015 | Imes | |
| 2016/0323156 A1* | 11/2016 | Zakaria | ............... H04B 17/318 |
| 2017/0005390 A1* | 1/2017 | Zakaria | ................... H04L 67/28 |
| 2017/0006595 A1* | 1/2017 | Zakaria | ................... H04L 67/12 |
| 2018/0014241 A1* | 1/2018 | Perdomo | ............... H04W 40/12 |
| 2018/0131571 A1 | 5/2018 | Ansari | |
| 2019/0020493 A1 | 1/2019 | Arling | |
| 2019/0268177 A1 | 8/2019 | Li | |
| 2019/0306232 A1* | 10/2019 | Brock | ................... H04L 9/0643 |
| 2020/0204539 A1* | 6/2020 | Robison | .......... H04W 12/00503 |

FOREIGN PATENT DOCUMENTS

| | | |
|---|---|---|
| WO | 2015/065539 A2 | 5/2015 |
| WO | 2016/100200 A1 | 6/2016 |
| WO | 2017/120243 A1 | 7/2017 |

OTHER PUBLICATIONS

Korean Preliminary Rejection dated Nov. 29, 2019, issued in corresponding Korean Patent Application No. 10-2019-0041209, filed Apr. 9, 2019, 4 pages.

Singh, M., et al. "Blockchain: A Game Changer for Securing IoT Data," Proceedings of the 2018 IEEE 4th World Forum on Internet of Things (WF-IoT), Singapore, Singapore, Feb. 5-8, 2018, pp. 51-55.

Jabara, G. B., "System and Method for Secure Appliance Operation," U.S. Appl. No. 16/664,380, filed Oct. 25, 2019.

Decision of Patent Grant dated May 29, 2020, issued in corresponding Application No. KR 10-2019-0041209, filed Apr. 9, 2019.

\* cited by examiner

| | SMARTHUB BLOCKCHAIN DB | | | | | | |
|---|---|---|---|---|---|---|---|
| DEVICE TYPE | DEVICE NAME | IP ADDRESS | MAC ADDRESS | DEVICE ID | PRIVATE KEY | PUBLIC KEY | DEVICE FEEATURE |
| TV | SAMSUNG | 192.168.1.1 | 231.222.222.11 | HOME_1_TV_1 | XXXX.XXX.XX | PUBLIC_KEY_1 | ON-OFF-CHANNEL SWITCH |

FIG. 8

SYSTEM AND METHOD FOR SECURE APPLIANCE OPERATION

CROSS REFERENCE OF THE RELATED APPLICATIONS

This application is a continuation-in-part of U.S. patent application Ser. No. 14/862,781, filed Sep. 23, 2015, which is a continuation of U.S. patent application Ser. No. 13/363, 943, filed Feb. 1, 2012, now U.S. Pat. No. 9,179,296, issued Nov. 3, 2015, which is a continuation-in-part of U.S. patent application Ser. No. 13/093,998, filed Apr. 26, 2011, now U.S. Pat. No. 8,995,923, issued Mar. 31, 2015, which is a continuation-in-part of U.S. patent application Ser. No. 12/958,296, filed Dec. 1, 2010, now U.S. Pat. No. 9,077,564, issued Jul. 7, 2015, which is a continuation-in-part of U.S. patent application Ser. No. 12/616,958, filed Nov. 12, 2009, now U.S. Pat. No. 8,190,119, issued May 29, 2012, which is a continuation-in-part of U.S. patent application Ser. No. 12/397,225, filed Mar. 3, 2009, now U.S. Pat. No. 7,970,351, issued Jun. 28, 2011.

BACKGROUND OF THE INVENTION

Field of the Invention

The present disclosure relates generally to telecommunications and, more specifically, to a system and method for secure operation with network-connected devices.

Description of the Related Art

Connected devices have evolved in the range of capability and complexity. Early sensors involved a simple function, such as reading a gas meter or electric meter and reporting the data back to a utility company via the Internet. However, a broad range of devices are now available for a "smart home" or office that may include safety sensors (e.g., gas detectors, smoke detectors, and the like), security devices (e.g., intrusion detection, motion sensors, security cameras, and the like), environmental controls (e.g., heating/cooling controls, ventilation, and the like) and operational status monitors (e.g., monitors in refrigerators, washer/dryer, and the like). The broad range of Internet connected devices are sometimes referred to as the "Internet of Things" (IoT) devices or appliances. In this context, the term "appliance" refers broadly to network-connected devices and not merely to home appliances, such as washers, dryers, refrigerators, and the like.

When one considers the complexity involved in a smart home or offices that are fully connected with a range of different IoT based sensors from different companies, it becomes clear how difficult it is to manage security, integration, and payment issues associated with the devices. Each device typically has its own controller. In addition, most existing smart home solutions are based on unlicensed networks, which provide minimum control and security. Some devices provide no security at all. The unlicensed network implementation makes a system more vulnerable to hacking.

A number of attacks involving corrupted IoT devices. For example, IoTroop leveraged a number of known security vulnerabilities to infect over 9 million IoT devices. In another example, Mirai malware caused a sustained distributed denial of service (DDoS) attack from more than 175, 000 IoT devices. A DDoS attack on Liberia nearly knocked out the country's entire Internet. In yet another example, a random denial of service (RDoS) attack in South Korea involved seven banks by exploiting IoT devices. Thus, the threat of network attacks using IoT devices is very real.

The vulnerability to a security breach is so high that many security checks are required to make a smart home concept a reality. For example, a smart home may have dozens of IoT devices that each transfer sensitive data over the Internet. Such an implementation becomes a significant security threat if not properly secured. In addition, if a single node on a home network is compromised, it puts the entire network at risk. Furthermore, different security protocols on different devices makes it more difficult to provide a trusted network. From a consumer perspective, privacy is a significant concern when several IoT devices may be communicating using personal information of the customer. Therefore, it can be appreciated that there is a significant need for a centralized communication system that will integrate IoT devices making networks more secure and convenient for end users. The present disclosure provides this, and other advantages, as will be apparent from the following detailed description and accompanying figures.

BRIEF DESCRIPTION OF THE SEVERAL VIEWS OF THE DRAWING(S)

FIG. 8 illustrates a sample data entry of a network appliance in a secured data base in accordance with the present disclosure.

DETAILED DESCRIPTION OF THE INVENTION

Figure 1:
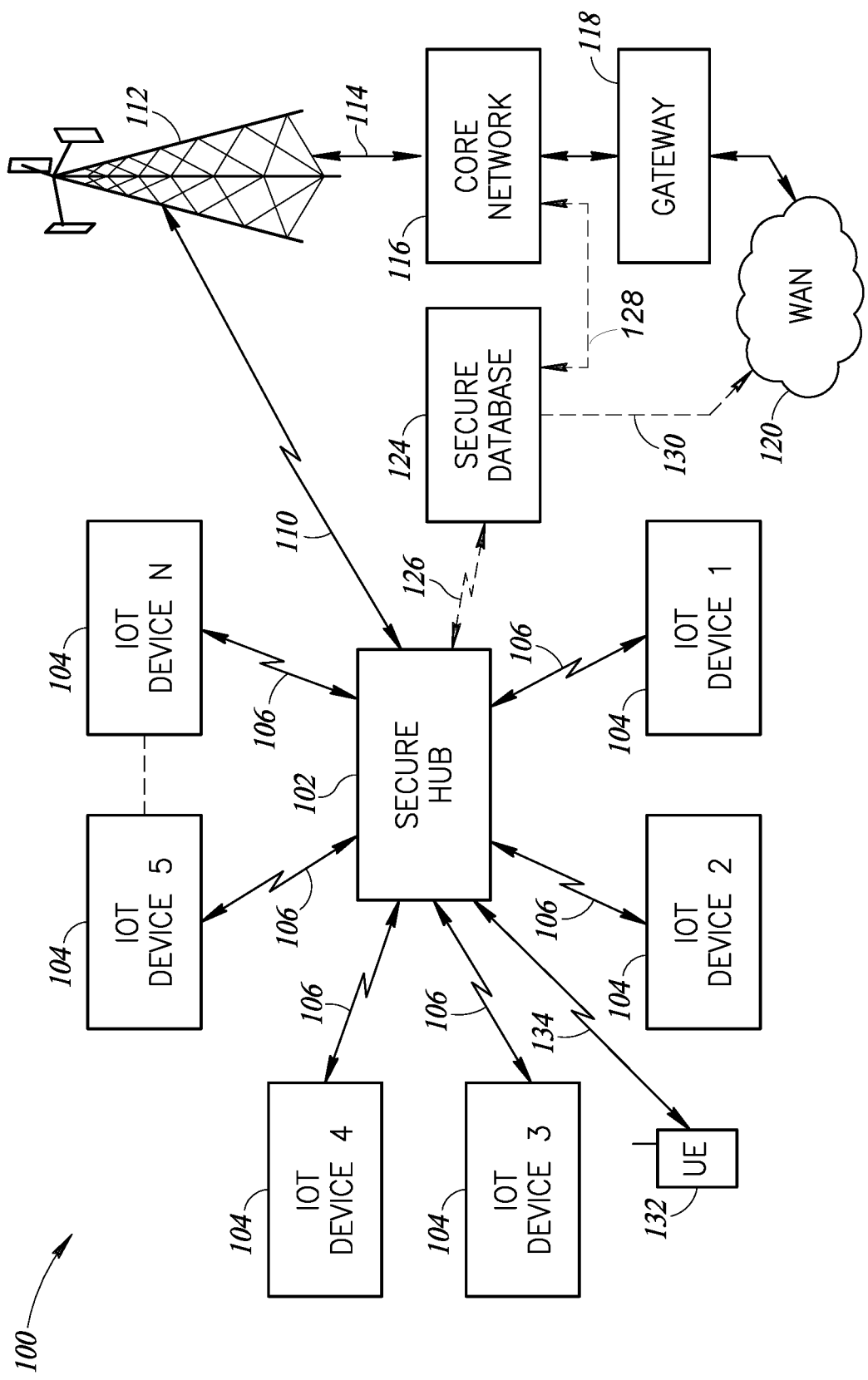
FIG. 1 illustrates an example of a system architecture to implement the system of the present disclosure.

The techniques described herein provide a fully integrated Plug-and-Play based secured solution using both licensed and unlicensed wireless networks. With the anticipated introduction of fixed 5G wireless networks, bandwidth will exceed the current bandwidth capabilities of existing wireline Internet bandwidth thus making unlimited data faster and more affordable. As will be described in greater detail herein, encryption technology, such as Blockchain technology is used to provide additional security. The Blockchain contains an inherent ability to cope with external attacks by using complex encryption of transaction ledgers contained within the block. In addition, Blockchain technology uses decentralized rather than centralized data storage, which has the advantage of making it more secure and more difficult for hackers to penetrate. These approaches minimize the potential of attacks on network-connected appliances. Appliances in the prior art are typically referred to as IoT devices because of their Internet connectivity. However, as will described in greater detail below, the appliances implemented in accordance with the present disclosure are not able to communicate directly with the Internet and, thus, are not IoT devices. Instead, the appliances described herein may be referred to as network-connected appliances because they are connected on a mesh network. As used herein, the term "appliance" refers broadly to network-connected devices and not merely to home appliances, such as washers, dryers, refrigerators, and the like.

In addition, the techniques described herein use public/private key encryption for each appliance as part of the Blockchain to provide additional appliance security as well as providing a technique to securely communicate with each appliance. As a certificate provider, certification of appliances provides an opportunity to monetize systems on a per-hub or per-appliance basis.

The present disclosure will provide examples of implementations of the secure network appliance system of the present disclosure. However, those skilled in the art will appreciate that the principles of the present disclosure are applicable in a smart home for lighting and environmental control, thus providing efficient utilization of energy resources based on user and environmental behavior, home security and monitoring with remote security and monitoring by utilizing smart sensors and cameras, pet care and tracking through the use of smart sensors thereby ensuring quality of care, smart grocery shopping and delivery, by utilizing smart sensors to automatically detect grocery requirements and order placements for on-time delivery, and elder care through the use of smart sensors and vital sign detectors to remotely monitor the elderly and provide on-time medical response in the event of an emergency.

In an enterprise environment, the system of the present disclosure may provide predictive maintenance thereby lowering operating capital costs by facilitating proactive servicing and repair of assets, such as vehicles, office equipment, and the like. In addition, the system can provide supply chain management with smart tracking of end-to-end supply chain cycle from manufacturing to delivery, asset verification and optimization with the use of sensor-embedded equipment to control utilization, verification, and process automated workflows. Fleet management may be provided using smart sensors and trackers to achieve operational efficiency and retail beacons, such as RFID enabled sensors to understand consumer behavior and provide intelligent marketing.

The system provides advantages for municipalities, such as smart metering with the use of autonomous metering of utilities, such as gas, electricity, and water, smart grid operation by providing efficient energy management and load balancing, water and waste management operations by efficiently managing water resources and recycling of waste for improved sustainability through the use of smart sensors. In addition, the system can provide smart transit planning through the use of automated traffic management utilizing real-time data provided by sensors. In addition, the system provides safety and security by monitoring potential threats through utilization of security cameras and automatic alerting of response teams in the case of safety hazards, fires, and the like.

In a manufacturing setting, the system enables smart manufacturing operations by providing smart control of manufacturing process/assembly line through the use of remote monitoring and timely adjustment of assembly line processes. The system provides for smart field services and connected workers by providing smart tracking in monitoring of operational teams for improved efficiency. Preventive maintenance may be provided through the use of remote sensors to thereby lower operating and capital costs by facilitating proactive servicing and repair of assets, such as vehicles, industrial equipment, and the like. The system provides for smart environment solutions through the use of automated environmental (e.g., heat/energy/water) controls to enable efficient use of resources. The system also provides for a digital supply chain with smart tracking of end-to-end supply chain cycle from manufacturing to delivery.

The techniques described herein are illustrated, in an exemplary embodiment, in the system diagram of FIG. 1 where a system 100 includes a secure hub 102. A plurality of network-connected appliances 1-N 104 are wirelessly connected to the hub 102 via a respective wireless communication links 106. Details of the wireless communication links 106 are provided below.

In addition to the wireless communication links 106, the hub 102 includes a cellular communication link 110 to one or more base stations 112. As those skilled in the art will appreciate, a cellular communication link can be established with multiple base stations. For the sake of clarity, FIG. 1 illustrates only a single base station 112. Those skilled in the art will further appreciate that the base station 112 is representative of a cellular system operated by one of the many different cellular network operators. The system 100 may be configured for satisfactory operation with any cellular network operator by configuring the hub 102 for communication using cellular technology compatible with the desired cellular network operator. That is, the hub 102 may be configured for communication using cellular standards, such as CDMA, GSM, or the like. The system 100 is not limited by the particular form of cellular communication.

FIG. 1 illustrates a backhaul connection 114 between the base station 112 and a core network 116 operated by the cellular network operator. Operation of the base station 112 and core network 116 are known to those skilled in the art and need not be described in greater detail herein. In certain circumstances, it may be desirable for the hub 102 to communicate with a wide area network (WAN) 120, such as the Internet. To permit access to the WAN 120, the core network 116 typically includes a gateway 118 to facilitate such communications. All communications from the hub 102 to the WAN 120 are pre-encrypted in the hub using, by way of example, pre-internet encryption (PIE) so that any data sniffers will only intercept encrypted data.

As will be described in greater detail below, communication control is accomplished through a unique device-to-device communication protocol referred to herein as ioXt protocol, to provide a secure communication links.

The system 100 also includes a secure database 124 to store encrypted data relating to the network appliances 104, the secure hub 102, and the overall system architecture. As will be discussed in greater detail below, the secure database 124 may be implemented in a variety of different configurations. The dashed lines connecting to the secure database 124 in FIG. 1 illustrate the different alternative configurations. For example, in a home configuration, the end user may wish to have the secure database 124 be locally present within the home. In this implementation, a direct communication link 126 is provided between the hub 102 and the secure database 124. In another implementation, the secure database 124 may be controlled and operated by the cellular network operator. In this implementation, the secure database 124 may be coupled to the core network 116 via a communication link 128. In yet another implementation, the secure database 124 may be accessed via the WAN 120. This may be particularly desirable for a distributed version of the secure database. In this embodiment, the secure database 124 is coupled to the WAN 120 via a communication link 130. As will be described in detail below, in an exemplary embodiment of the system 100, the secure database 124 may be configured as a Blockchain, which may be part of a cloud computing network. In one embodiment, portions of the secure database may be integral with the hub 102 or accessible by the hub and contain information for local network appliances 104 controlled by the hub. The secure database 124 may contain information for each user, including the list of hubs 102, network appliances 104, and user information. Those skilled in the art will appreciate that the secure database 124 may contain information for multiple users and may authorize users to access only a portion of the network appliances 104 connected to a particular hub. For example, in a home environment, the system 100 can be configured to allow all users to control certain elements, such as lights, but restricts certain users (e.g., children) from accessing other network appliances, such as environmental controls, security settings, and the like. Thus, the secure database can include not only information about the hub 102 and the network appliances 104, but also includes information about users, including the identification of which secure hubs 102 may be accessible to users and which network appliances 104 may be accessible to users.

A copy of that portion of the secure database 124 may be further stored as a block in the Blockchain database. The Blockchain database may contain data entries for all network connected appliances 104, not only in a particular home, but in all homes, enterprise implementations, and other implementations of the system 100 operating in accordance with the ioXt protocol.

Finally, FIG. 1 illustrates a user equipment (UE) 132 that communicates with the hub 102 via a wireless communication link 134. The UE 132 works with the hub 102 to provide a secure connection to all of the network appliances 104 when the UE is in communication with the hub. As will be described in greater detail below, this control is accomplish through the use of the ioXt protocol, to provide a secure link and operation equivalent to a Blockchain implementation in an "intranet" mesh environment. As will be described in greater detail below, the mesh will allow various network appliances 104 to communicate with each other in a peer-to-peer network. In this network, data can be securely shared from one network appliance 104 to another.

The UE 132 may also control the system 100 from a remote location. For example, a homeowner may be on vacation, but can still access and control the system 100. In this embodiment, the UE 132 communicates with the secure hub via the cellular communication link 110. The UE 132 may typically access the WAN 120 and communicate with the cellular network operator via the gateway 118 and the core network 116. Alternatively, the UE 132 may communicate with the cellular network operator directly via the base station 112 or other base station (not shown) that is part of the cellular network. In this embodiment, the UE 132 accesses the core network 116 using a cellular communication link (not shown).

Data from the UE 132 is transmitted from the base station 112 to the hub 102 via the cellular communication link 110. In turn, the hub 102 acts upon commands initiated by the UE 132. In response to certain commands, the hub 102 may receive sensor data from one or more of the network appliances 104 and provide the information to the UE 132 via the base station 112 in the reverse order described above. For example, the UE 132 may send a command to check on the temperature within a home. Upon receipt of the command, the hub 102 communicates with a particular one of the network appliances 104 to receive sensor data indicating the environmental temperature. That data may be passed along to the UE 132 in the manner described above. Furthermore, the UE 132 may alter the temperature in the home using a different command. In this circumstance, the command is relayed to the hub 102 via the WAN 120 and the cellular network operator to be transmitted to the hub 102 using the cellular communication link 110. In response to the command, the hub 102 generates commands to the particular network appliance 104 to alter the environmental temperature accordingly.

A software application program executing on the hub 102 and the UE 132 permits a user to read data from a network appliance 104 (e.g., read the temperature from a temperature sensing network appliance 104) and/or control a network appliance (e.g., turn up the temperature). Appliances may be controlled directly from the hub 102 or from the UE 132 communicating with the hub.

Figure 2:
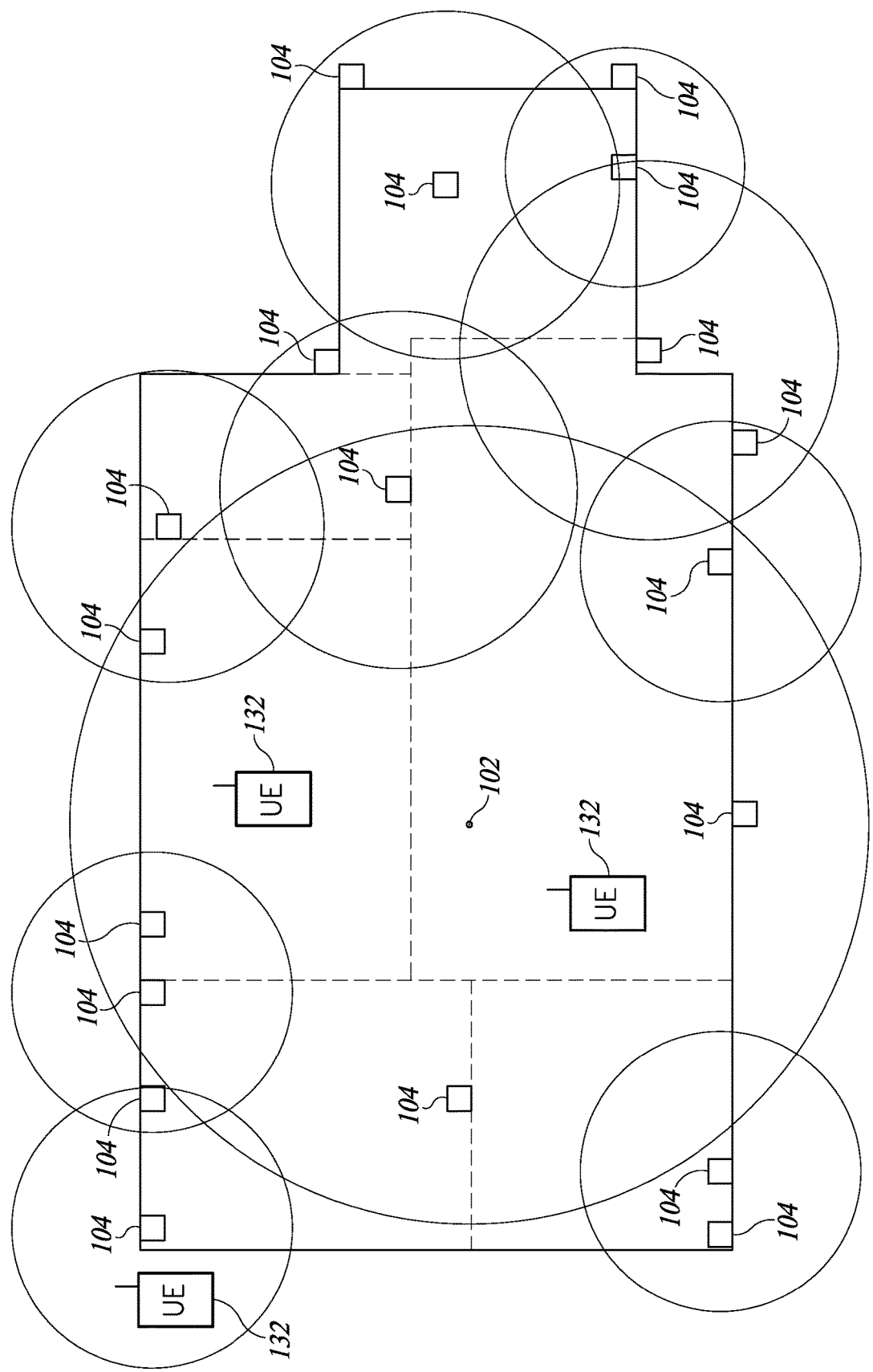
FIG. 2 illustrates an example of a system implementation in accordance with the architecture of FIG. 1.

FIG. 2 illustrates an embodiment of the system 100 that may be suitable for implementation in a home. In the embodiment illustrated in FIG. 1, all of the network appliances 104 are within communication range of the hub 102 via the respective communication links 106. However, in the embodiment of FIG. 2, the effective communication range of the hub 102 may not provide coverage for the entire home. In the embodiment of FIG. 2, one or more of the network appliances 104 effectively function as nodes on a mesh network that receive commands in the form of encrypted data. The network appliance 104 will only decrypt commands that are intended for that particular appliance. For all other commands, the network appliance 104 retransmits the encrypted data to other nearby network appliances. That is, a network appliance 104 may be within range of the hub 102 and receive commands therefrom. If the command (e.g., read sensor data or perform an action) is intended for the particular network appliance 104, it decrypts the data and acts on the command. However, under other circumstances, the command from the hub 102 may be for a different network appliance 104. In that event, the network appliance 104 receives and retransmits the command to any other network appliance 104 within its range. Each network appliance 104 will, in turn, act on a command if the command is intended for that particular appliance or retransmit the command if the command is intended for a different network appliance. Thus, commands from the hub 102 may be propagated through the mesh network from network appliance to another until it is received by the network appliance 104 for which the command was intended.

Using the command retransmission process described above, multiple appliances 104 may receive the same command. However, through the encryption process, only the command intended for a particular appliance 104 can be decrypted by that particular appliance. All other commands received by the appliance 104 will remain encrypted. Through this mesh network, the UE 132 operates with a software application program to control all appliances. Even if the UE 132 is on one side of the house, it can effectively communicate with appliances 104 throughout the house via the data sharing techniques, which will be described in greater detail below. The mesh connection between appliances effectively creates a tether that allows appliances that are far away from each other to still receive data intended for a particular appliance.

All communications between the hub 102 and the network appliances 104 can be encrypted using Hyper Text Transfer Protocol Secure (HTTPS). In addition, the hub 102 generates an encrypted Secure Socket Layer (SSL) certificate for each appliance to provide a security layer. Only a network appliance 104 with the proper SSL certificate can decrypt a command from the hub 102. Part of the HTTPS data includes an address identifying the intended destination network appliance 104. Each network appliance has an address and will only decrypt commands from the hub 102 that are intended for that particular network appliance. As discussed above, if an network appliance 104 receives a commands (from the hub 102 or from another network appliance) that is not addressed to that particular network appliance, it will retransmit the encrypted command thus propagating the command throughout the home until the command is received by the intended network appliance 104.

An example of the data entry in the secure database 124 (see FIG. 1) for a television set is illustrated in FIG. 8. The database entry includes a device identification including a device type and name as well as an IP address, MAC address, and a device ID data entry. In addition, the database may store a private key and public key for encryption purposes. Finally, the database may include controllable features of the device, such as on-off, channel selection, volume control, and the like. As discussed above, the IP address and/or MAC address may be used to uniquely identify the device and command data transmitted by the hub 102.

In this implementation, network appliances 104 can only communicate with the hub 102, either directly or via another network appliance. FIG. 2 illustrates a plurality of UEs 132, which may correspond to the wireless communication devices (e.g., smartphones) of different users, such as family members, roommates, or the like. In some cases, the UE 132 may be within range of the hub 102 and can communicate directly therewith using the communication link 134 illustrated in FIG. 1. In other circumstances, the UE 132 may be out of direct communication range with the hub 102, but within communication range of one or more of the network appliances 104. In this circumstance, the UE 132 can communicate with the hub 102 via one or more of the network appliances 104. Commands from the UE 132 are relayed via one or more network appliances 104 until the command is received by the hub 102. The hub 102 responds to the command by generating its own commands that are directed to one or more network appliances 104 to thereby execute the command from the UE 132. For example, the UE 132 may send a command to turn on all external lights in the home. That command is propagated through the mesh network to the hub 102. In turn, the hub 102 generates the necessary commands to turn on the external lights. The command is transmitted from the hub 102 to one or more network appliances 104 that control external lighting. Each of the network appliances 104 that control external lighting are able to decrypt and execute the command.

Prior art IoT devices are typically couple to the Internet directly or via a WiFi router and are thus vulnerable to an attack from the Internet. In contrast, the hub 102 effectively serves as a proxy to protect network appliances 104 from an Internet hack. The network appliances 104 cannot be accessed by an external device, other than an authenticated UE 132, thus providing a secure form of operation. As noted above, the UE 132 can access and control the system using the short-range communication link 134 (see FIG. 1) to communicate directly with the hub 102. Alternatively, the UE 132 can communicate with the hub 102 via the base station 112 by communicating with the cellular network directly via a cellular communication link (not shown) or by accessing the cellular network using the WAN 120.

The hub 102 contains at least a portion of the secure database 124 (see FIG. 1) for all of the network appliances 104 in a particular environment, such as a home. Key information for the appliances is stored in the hub 102 and is encrypted using, by way of example, AES-256 encryption. Other forms of encryption may also be satisfactorily employed to protect the data in the secure database 124 in the hub. The hub 102 authenticates and verifies each user before granting access to the network appliances 104. Only the hub 102 and the software application executing on the UE 132 can decrypt any data contained within the secure database 124 in the hub. The software application in the UE 132 can receive an encrypted list of appliances 104 from the hub 102. With a Blockchain implementation, the secured database 124 may be partially implemented within the hub 102. The portion of the secure database 124 within the hub 102 contains the encrypted data for all devices controlled by the hub. In addition, a copy of that portion of the secure database is encrypted as a block in a Blockchain database that contains encrypted data for all hubs in various locations.

In addition, cellular communication with the base station 112 is only possible via the hub 102. The hub 102 also provides the only access to the WAN 120 via the gateway 118, as described above. In an exemplary embodiment, the network appliances 104 communicate with the hub 102 using a short-range communication protocol, such as IEEE 802.11, often referred to as WiFi. Other forms of short-range communication, such as Bluetooth, ZigBee, Z-Wave communication, and the like may also be used to form the wireless communication links 106 (see FIG. 1) between the hub 102 and the network appliances 104.

Figure 3:
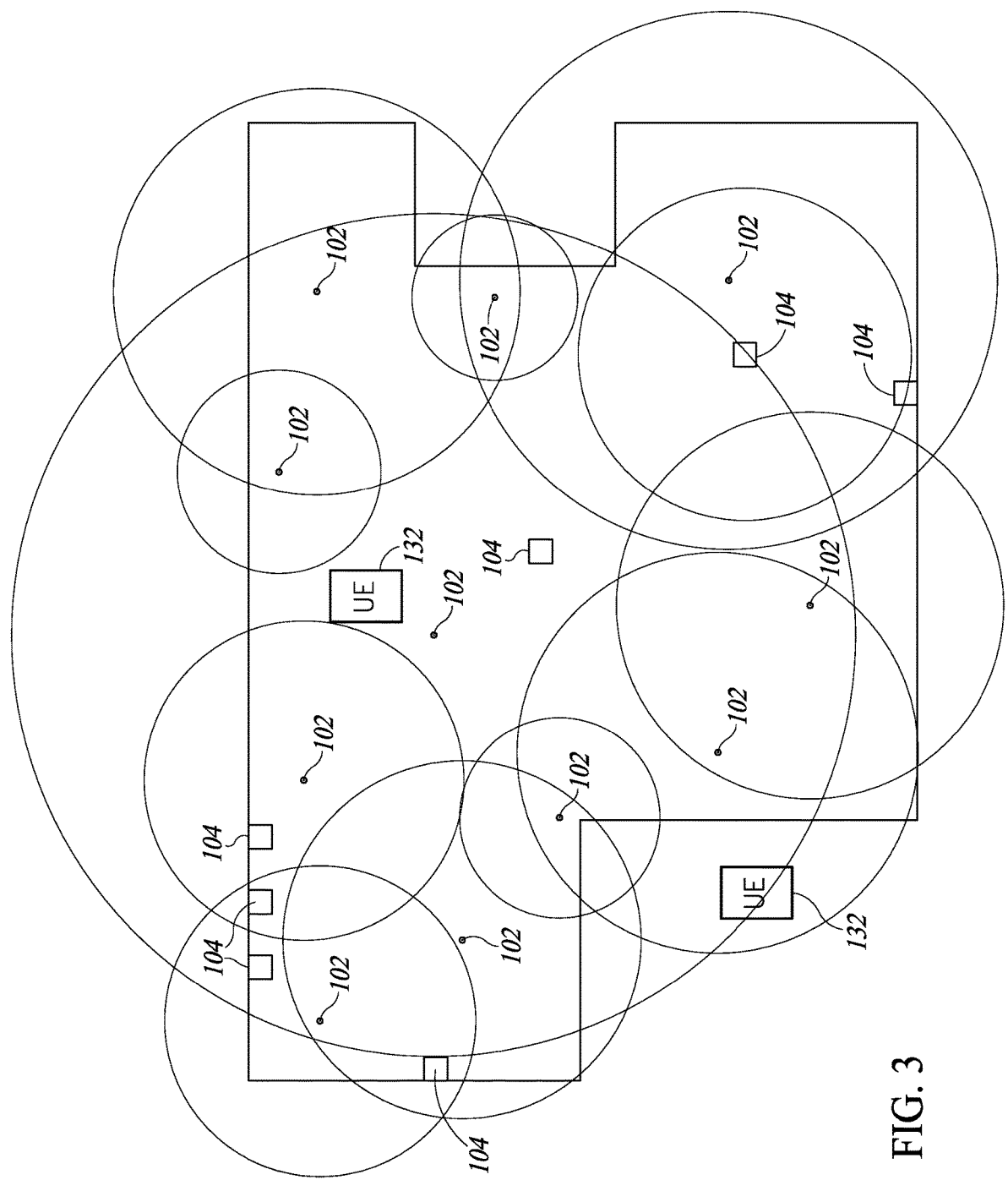
FIG. 3 illustrates an example of an alternative system implementation in accordance with the architecture of FIG. 1.

FIG. 2 illustrates a peer-to-peer mesh network where each of the network appliances 104 can function as nodes on the network. FIG. 3 illustrates another example implementation of the system 100 that may be suitable for an enterprise architecture. In circumstances where an enterprise may wish to provide network appliances 104 throughout a large area, such as a building, factory, group of buildings, campus or the like, the installation can include a plurality of hubs 102 that form a peer-to-peer mesh network. In this embodiment, one of the hubs 102 may be designated as a master hub. Internet access is controlled through the master hub 102. Although the embodiment of FIG. 3 is described as an implementation suitable for an enterprise architecture, those skilled in the art will appreciate that the different architectures of FIGS. 2-3 are both useful in a home environment or a work environment.

Furthermore, the system 100 of FIG. 2-3 may be configured to operate with a plurality of UEs 132. The various users can be spouses, roommates, family members, etc. in a home environment and employees, supervisors, administrators, or the like, that are authorized to access the system 100 using their respective UEs 132 in an enterprise environment. In one embodiment, the UE 132 may communicate with any hub 102 within communication range. In this embodiment, the hub 102 within communication range of the UE 132 may respond to commands from the UE 132, such as reading sensor data or performing an action. In this implementation, each hub 102 contains a database of connected users and connected network appliances 104. In a manner similar to that described above with respect to FIG. 2, the implementation in FIG. 3 allows the hubs 102 to act on commands for network appliances 104 within range of the particular hub. If the command from the UE 132 is intended for an network appliance 104 not within range of the particular hub 102, the hub will act as a node in a peer-to-peer mesh network and pass the command along to other hubs within radio frequency communication range. In an exemplary embodiment, the hubs 102 communicate with each other via WiFi or other suitable form of short-range communication. The various encryption and protection techniques discussed herein (e.g., WPA 2, WPA 3, HTTPS, and the like) are applicable to the embodiment of FIG. 3 as well. If the network appliance 104 for which the command is intended is not within radio communication range of any particular hub 102, the hub acts as a node on the mesh network and transmits the command to all other hubs within communication range. In turn, each hub 102 will pass the command along until the command is received by the network appliance 104 to which the command is directed. That network appliance 104 will decrypt and execute the command.

In an alternative embodiment, only the master hub 102 may issue commands. In this embodiment, the UE 132 can communicate directly with the master hub 102 if it is within range of the master hub. If the UE 132 is within range of a different hub 102 (i.e., not the master hub), the hub receiving the command will pass the command along in the mesh network until it is received by the master hub. In this embodiment, only the master hub 102 may contain the portion of the secure database 124 (see FIG. 1) for connected users and appliances within the particular facility. As discussed above, the secure database 124 may be encrypted using AES-256 encryption or other suitable form of encryption. When the master hub 102 receives a command from the UE 132 (either directly or via a relay hub), the master hub generates the command and propagates the command to other nearby hubs. The hubs 102 in the mesh network will relay the command until the command is received by a hub within communication range of the intended network appliance 104. That hub will transmit the command to the network appliance 104, which will decrypt and execute the command. In an exemplary embodiment, each hub 102 that is a node in the mesh network transmits the command data. The command is received by other nearby hubs 102 within range of the transmitting hub. The commands are also received by the network appliances 104. However, as described above with respect to FIG. 2, the network appliances 104 will only act upon commands intended for that particular network appliance or appliances. Thus, in the embodiment described above, it is not necessary that the network topology is defined such that every network appliance 104 is mapped to a specific hub 102. Instead, the hubs 102 simply transmit the received commands until the command has been propagated throughout the system 100. At some point during that propagation, the command will be received by the intended network appliance 104.

Thus, the system 100 can be implemented using a peer-to-peer network comprising a plurality of network appliances 104 functioning as nodes on a mesh network (see FIG. 2) or implemented as a peer-to-peer network using a plurality of hubs 102 functioning as nodes on a mesh network (see FIG. 3). Those skilled in the art that a hybrid version of the implementation of FIGS. 2-3 are also possible where nodes on a mesh network include a plurality of hubs 102 and a plurality of network appliances 104.

Figure 4:
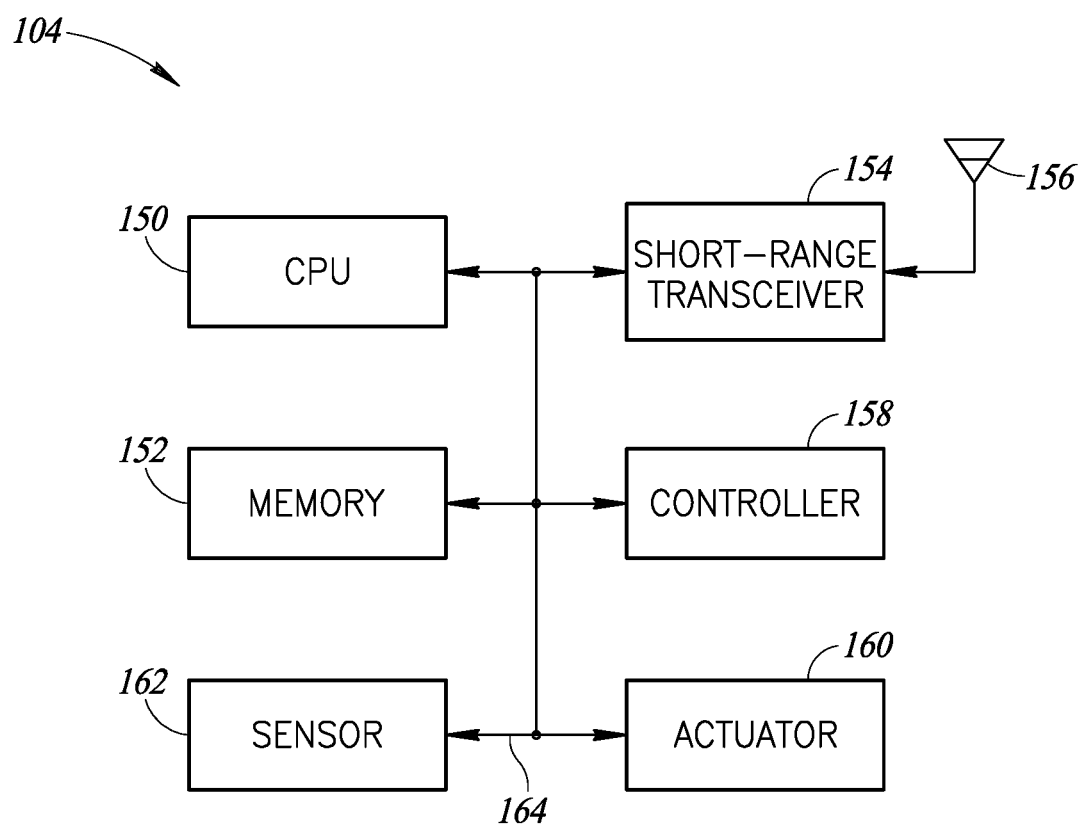
FIG. 4 is a functional block diagram of a network connected appliance used in the system architecture of FIG. 1.

FIG. 4 is a functional block diagram of an exemplary network appliance 104. The network appliance 104 includes a central processing unit (CPU) 150 and a memory 152. In general, the CPU 150 executes instructions using data and instructions stored in the memory 152. The CPU 150 may be implemented as a conventional processor, microcontroller, application specific integrated circuit (ASIC), or the like. Similarly, the memory 152 may include random access memory, read-only memory, flash memory, and the like. Those skilled in the art will appreciate that the CPU 150 and memory 152 may be integrated into a single device. The network appliance 104 is not limited by the specific hardware used to implement the CPU 150 and memory 152.

The network appliance 104 also includes a short-range transceiver 154 and antenna 156. As discussed above, the short-range transceiver 154 may be implemented as a WiFi transceiver or other suitable short-range transceiver. The short-range transceiver 154 is used to communicate with the hub or hubs 102 or other network appliances 104 in a peer-to-peer mesh network.

The network appliance 104 also includes a controller 158 that controls operation of the network appliance. The controller 158 may typically be implemented as a series of instructions stored in the memory 152 and executed by the CPU 150. However, the controller 158 is illustrated as a separate block in FIG. 4 because it performs a separate function.

FIG. 4 also illustrates an actuator 160 and a sensor 162. Those skilled in the art will appreciate that FIG. 4 illustrates a generic network appliance 104 that may perform one or more functions. Some network appliances 104 may include one or both of the actuator 160 and sensor 162. For example, a thermostat in a home may include a sensor 162 to read the temperature and provide temperature data to the user and display temperature data on the UE 132 (see FIG. 1) and include the actuator 160 to control the temperature in response to commands from the user. Similarly, a security camera may include a sensor 162 in the form of a video camera element while the actuator 160 may be a motorized element to allow directional control of the camera. Other network appliances 104 may include only one of the actuator 160 or sensor 162. For example, a smoke detector may only include the sensor 162 while light controller may only include the actuator 160. Those skilled in the art will appreciate that the network appliance 104 may include multiple actuators 160 and/or multiple sensors 162. Furthermore, the network appliance 104 may include a wireless communication device, such as WiFi, Bluetooth, or the like, to permit the actuator 160 and/or sensor 162 to be wirelessly controlled via wireless commands from the network appliance 104.

The various components in the network appliance 104 are coupled together via a bus system 164. The bus system 164 may include an address bus, data bus, control bus, power bus, and the like. However, these various buses are illustrated FIG. 4 as the bus system 164.

The network appliance 104 uses conventional power sources (not shown). For example, the network appliance 104 may be battery powered, or may be plugged in to a wall outlet. Alternatively, the network appliance 104 may be powered by a low voltage power distribution system, which may be convenient in an enterprise implementation. These conventional forms of power supplies are within the knowledge of one skilled in the art.

Figure 5:
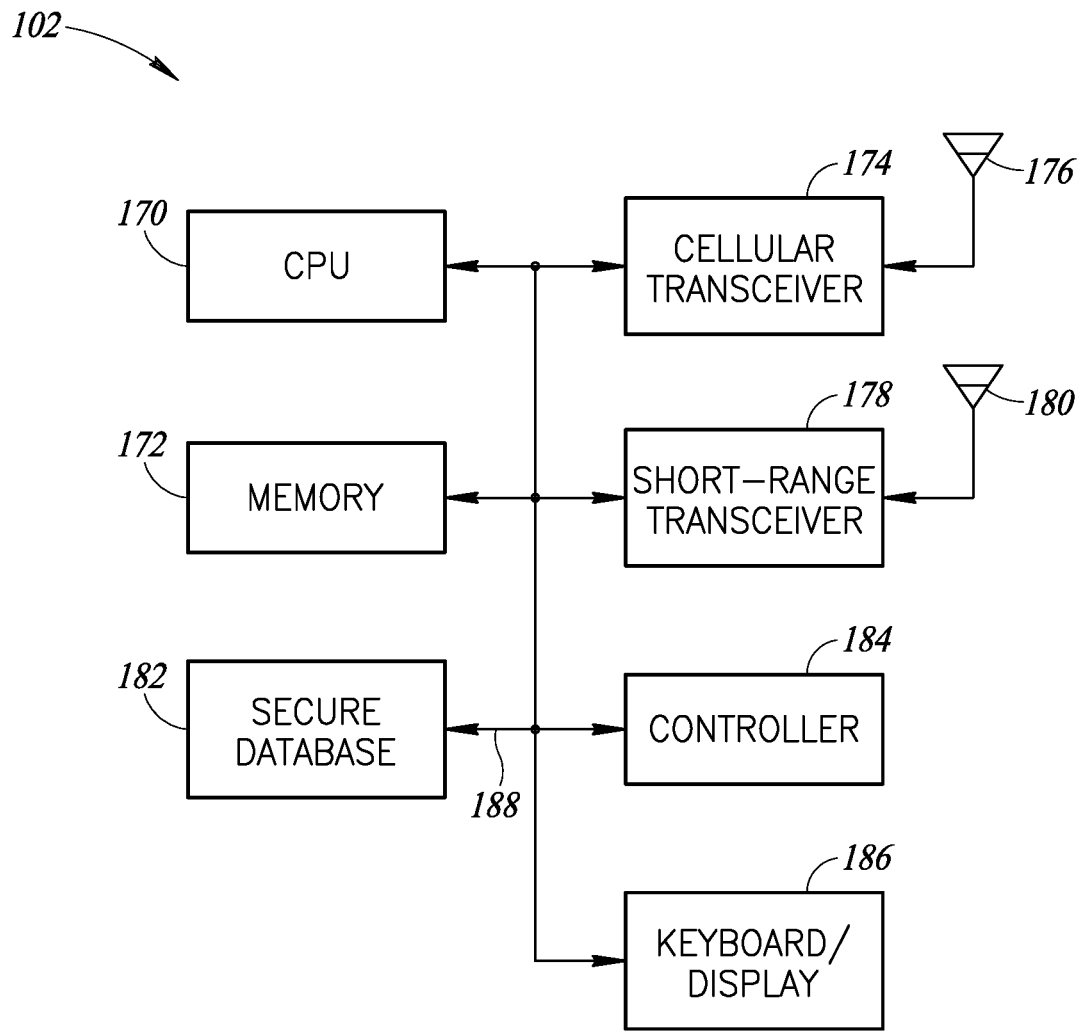
FIG. 5 is a functional block diagram of the secure hub used in the system architecture of FIG. 1.

FIG. 5 is functional block diagram of an exemplary embodiment of the hub 102. The hub 102 includes a CPU 170 and memory 172. In general, the CPU 170 executes instructions using data and instructions stored in the memory 172. The CPU 170 may be implemented as a conventional microprocessor, microcontroller, ASIC, or the like. The memory 172 may include random access memory, read-only memory, flash memory, and the like. As discussed above with respect to the network appliance 104, the CPU 170 and memory 172 may be integrated into a single device. The hub 102 is not limited by the specific hardware used to implement the CPU 170 and memory 172.

The hub 102 also includes a cellular transceiver 174 and an associated antenna 176. Those skilled in the art will appreciate that the specific form of the cellular transceiver 174 depends on the particular cellular network operator. As discussed above, the cellular transceiver 174 may be implemented with any conventional communication protocol, such as CDMA, GSM, or the like. Furthermore, the cellular transceiver may be implemented using technologies, such as 4G, LTE, 5G, or the like.

The hub 102 also includes a short-range transceiver 178 and associated antenna 180. The cellular antenna 176 and short-range antenna 180 may be implemented as a single antenna. As discussed above, the short-range transceiver 178 may be implemented as a WiFi transceiver or other suitable form of short-range communication.

The hub 102 also includes a secure database 182. As discussed above, in various implementations, the secure database 182 may be a portion of the secure database 124 (see FIG. 1) and contain information for all appliances controlled by the hub. The information stored in the secure database 182 may be encrypted using AES-256 encryption or other suitable form of encryption. In addition, as will be described in greater detail below, the secure database 182 may be implemented as a portion of the Blockchain stored locally within the hub 102. Alternatively, the Blockchain secure database may be stored centrally or in a distributed fashion in an enterprise implementation. In yet another implementation, the Blockchain data storage may be distributed over a wide number of machines using, by way of example, a cloud computing network. Details of the Blockchain storage are provided below.

The hub 102 also includes a controller 184 that controls operation of the hub 102. Those skilled in the art will appreciate that the controller 184 may be typically implemented as a series of instructions stored in the memory 172 and executed by the CPU 170. Nonetheless, the controller 184 is illustrated in the functional block diagram of FIG. 5 as a separate block because it performs a separate function. The controller 184 may control access to the secure database 182, and further control operation of the cellular transceiver 174 and short-range transceiver 178. The controller 184 is responsible for authentication of a user as well as the generation of commands to be transmitted to network appliances 104 via the short-range transceiver 178 and to receive data (e.g., sensor data) from network appliances. The controller 184 may also control access to the cellular transceiver 174 and thereby control access to the WAN 120 (see FIG. 1). As noted above, the network appliances 104 cannot access the Internet and are thus protected from typical attacks that IoT devices currently experience.

The hub 102 also includes a keyboard/display 186. Although a keyboard and display may be implemented separately, in an exemplary embodiment, the display is a touch-sensitive display that can be used to implement a keyboard as well. The keyboard/display 186 can be used to generate commands for the network appliances 104 in the manner described above. The display can be used to list network appliances 104 and allow a user to select commands for the network appliances. As previously noted, the application software program executing on the UE 132 or on the hub 102 can be used to control the network appliances 104. Commands from the UE 132 are transmitted to the hub 102 in the manner described above.

The various components in the hub 102 are coupled together via a bus system 188. The bus system 188 may include an address bus, data bus, control bus, power bus, and the like. However, these various buses are illustrated in FIG. 5 as the bus system 188.

As with the implementation illustrated in FIG. 2, all communications between the hubs 102, the network appliances 104, and the UEs 132 can be encrypted using HTTPS. In addition, the master hub can generate the encrypted SSL certificate for each appliance, as described above with respect to FIG. 2. Furthermore, the IEEE 802.11 standard includes provisions for WiFi Protected Access 2 (WPA 2) protection for additional security in communications between the hub 102 and the network appliances 104. An improved version of WiFi protection (WPA 3) is expected to replace WPA 2 in the near future and can be incorporated into the system 100.

The hub 102 also may include signal boosting capability for both cellular transceiver 174 and the short-range transceiver 178. If the facility is located in an area with weak cellular coverage, the hub 102 may increase the amplification of the signals received from the base station 112 (see FIG. 1) and boost transmit power to more effectively transmit data to the base station. The controller 184 may be configured to measure signal strength of received signals to determine whether amplification and increased transmit power are necessary. In fringe areas of cellular coverage, this technique may improve overall operation of the system 100. When operating as a picocell, the hub 102 effectively operates as a base station in the manner similar to the base station 112. However, unlike the base station 112, which uses the backhaul 114 to communicate with the core network 116, the hub 102 communicates wirelessly with the base station 112. However, the hub 102 may broadcast its own channel to thereby effectively function as a base station. Based on the type of cellular system, the channel may include, by way of example, a pilot signal or other cellular identifier. Cellular operation is known in the art and need not be described in greater detail herein.

Similarly, the hub 102 may provide greater range for the short-range transceiver 178. In this aspect, the controller 184 can measure signal strength of signals received from any of the network appliances 104 or the UE 132 to determine whether the system 100 would benefit from increased amplification of received signals and increased transmit power in the short-range transceiver 178. If necessary, the controller 184 can boost the amplification on the receive portion of the short-range transceiver 178 and increase the transmit power on the transmit side of the short-range transceiver. With this dynamic capability, the hub 102 can effectively increase both cellular and short-range wireless coverage, capacity, performance, and efficiency. The intelligent control provided by the controller 184 measures signal strength and boosts signals as necessary.

Figure 6B:
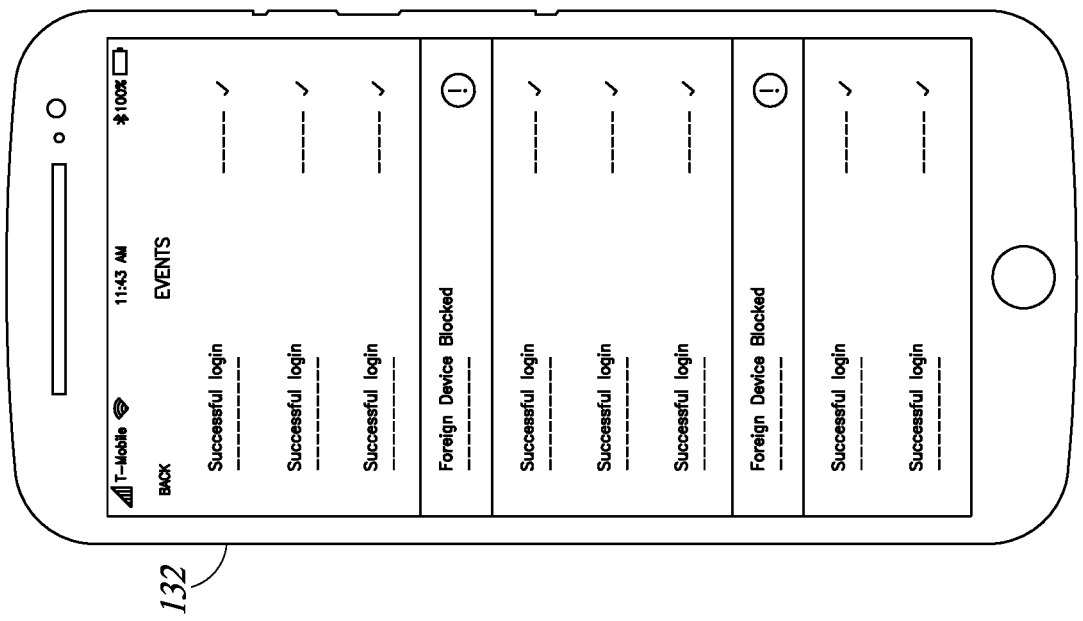
FIGS. 6a-6b illustrate screen shots of a log in procedure using devices in accordance with the present disclosure.
Figure 6A:
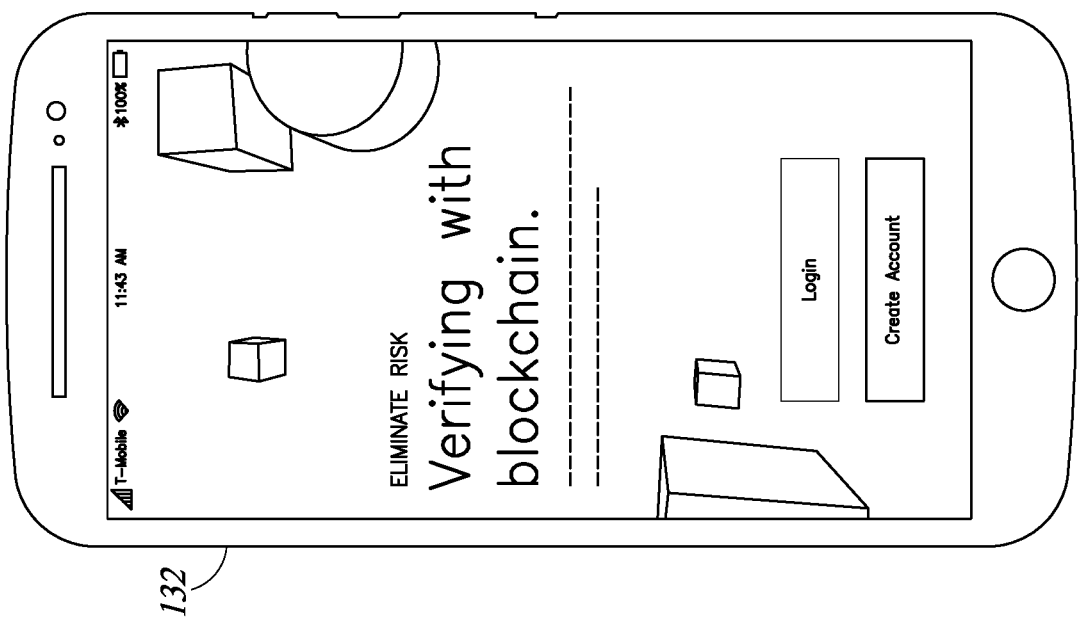

Access to the hub 102 by the UE 132 is strictly controlled. As previously described, a software application program is located on both the hub 102 and the UE 132. The software application controls the network appliances 104 locally via the hub 102, as described above. For an initial setup, a special access code is generated randomly by the hub 102 to identify and authenticate the UE 132. Subsequent operation and device management are executed by the software application program on the hub 102 and the UE 132. Subsequent authentication of the UE 132 utilizes a two-step authentication procedure. FIG. 6A illustrates a screen display of the UE 132 with a login selection. The user provides a user name and password as part of the login procedure. Upon receipt of the user name and password, the hub may send a verification passcode to the UE 132 that must be entered within a predetermined period of time. If a user forgets the password, they will have to start all over again and re-register the hub 102 and all network appliance 104.

The hub 102 logs all login attempts, whether they are successful or unsuccessful. FIG. 6B illustrates a display of the UE 132 listing a series of events, including successful logins and login attempts that were blocked.

The system 100 uses a two-factor authentication technique. When the system 100 is initially set up, the user must manually register the UE 132 and each of the plurality of network appliances 104 with the hub 102. The data entries associated with the UE 132 and each network appliance 104 are encrypted and stored in the secure database 182 (see FIG. 5) within the hub 102. As previously described, the hub 102 periodically communicates with the secure database 124 (see FIG. 9) as part of Blockchain stored on one or more servers 170 in the Cloud 172. This maintains synchronization between the hub 102 and the Blockchain on the Cloud 172.

Figure 7:
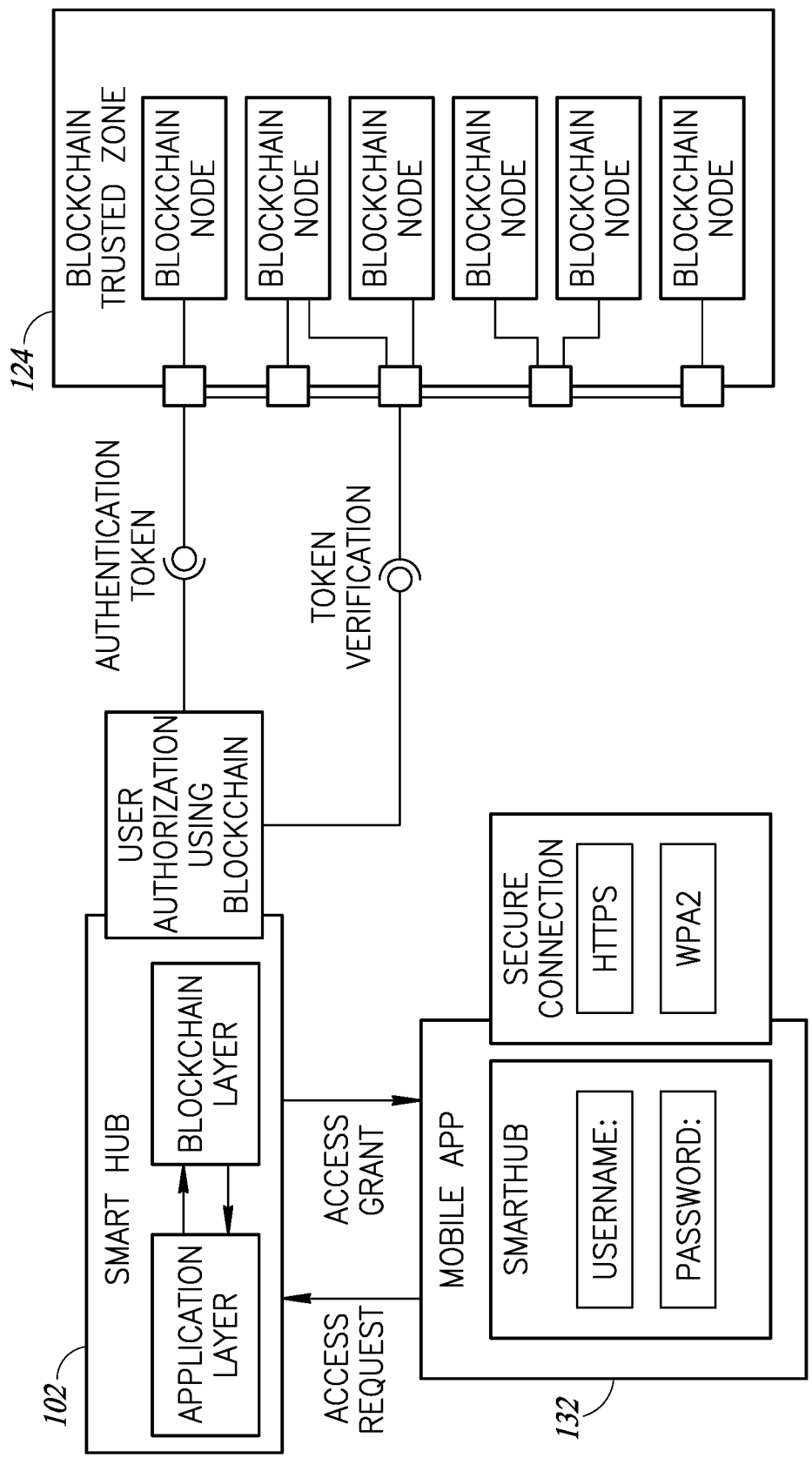
FIG. 7 illustrates a two-step authentication procedure.

Once the initial installation is complete, the system permits the addition of new users or network appliances. The addition of a new UE 132 is illustrated in FIG. 7. In step 1 of FIG. 7, the unauthenticated UE requests access. In step 2, the hub 102 generates an authentication token (e.g., a device password and/or identification code) for transmission to the secure database 124, implemented as a Blockchain. The hub 102 also sends a notification message to all previously authenticated UEs 132 to provide notification and to request approval for the addition of a new UE. If approved by all previously authenticated UEs 132, the Blockchain generates a token verification in step 3 and, if all tokens are authentic, the hub 102 grants access to the new UE in step 4. The secure database 182 (see FIG. 5) and the secure database 182 (see FIG. 9) are updated to create a new data entry for the newly authenticated UE.

In subsequent authentications, when the UE 132 comes within range of the hub 102, the hub will recognize the UE because its data is already present in the database 182. This is the first authentication factor. In the second authentication factor, the hub 102 sends a verification message to the UE 132. This may be in the form of a passcode that the user must enter within a predetermined time-out period of some other known authentication step.

Similarly, new network appliances 104 may be added to the system. In one embodiment, the UE can manually add a network appliance 104 by clicking an "Add Device" command in the software application program. Alternatively, the hub 102 automatically detects the presence of a new unauthenticated network appliance and initiates an authentication process. As discussed above, the hub 102 sends a notification message to previously authenticated UEs 132 to request authorization to add the new network appliance. If authenticated, the system adds the new network appliance using the token verification process described with respect to UE authentication in FIG. 7 above. Those skilled in the art will appreciate that, with a large number of authenticated UEs, such as may be present in an enterprise implementation, it may be undesirable to require approval of all authenticate UEs to add a new UE or a new appliance. Accordingly, the system can provide for the designation of a portion of the authenticated UEs 132 to serves as control for authentication purposes. As part of an auto-authentication process, if the new network appliance is designated as a certified ioXt compliant device, the hub 102 can eliminate the UE notification process described above and authenticate the new network appliance without human intervention. As described above, the system 100 creates a data entry in the database 182 (see FIG. 5) or the database 124 (see FIG. 9) for all newly authenticated UEs or network appliances.

If an unauthorized individual (i.e., an intruder) downloads the software application and attempts to gain access to the system 100, the hub 102 will ask for authentication information such as described above (i.e., user name and password). Because the intruder UE is unauthenticated, the notification message to authenticated UEs 132 will permit any of the users to deny access.

If the user name and password are compromised, the hub 102 will use an additional security layer provided by Blockchain, as illustrated in FIG. 7. The intruder UE will not be present in any authentication database and will be blocked from access to the system 100.

Figure 9:
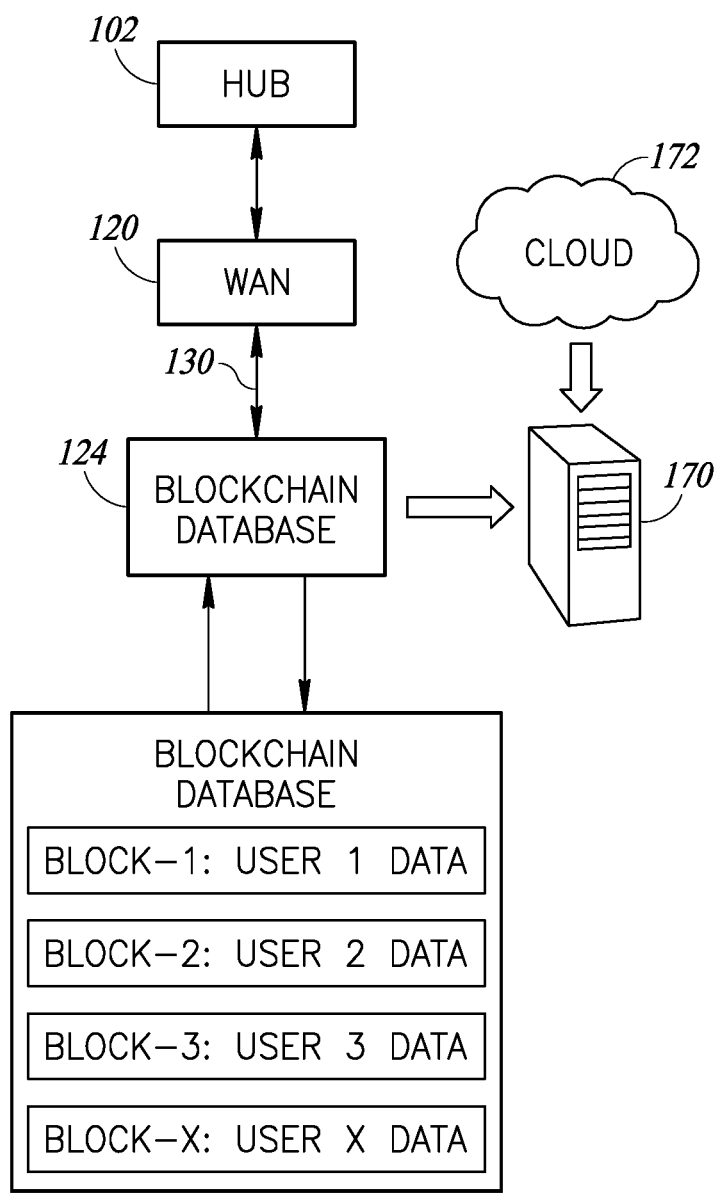
FIG. 9 illustrates a Blockchain implementation of a secure database.

The system 100 can automatically detect the installation of new components, such as the hub 102, or a new network appliance 104, in the manner described above. If the hub 102 is replaced, a new hub resynchronization process through the master Blockchain database is implemented for the user. FIG. 9 illustrates an exemplary architecture of the Blockchain database. As noted above, the hub 102 communicates with the WAN 120 via the cellular network operator, using the base station 112 (see FIG. 1), the core network 116, and the gateway 118. FIG. 9 illustrates the communication link 130 between the WAN 120 and the secure database 124. As illustrated in FIG. 9, the Blockchain database includes a separate block for each user and contains all data associated with that user. As previously discussed, that information can include a list of one or more hubs that the user may access as well as a list of all network appliances 104 that may be accessed by a particular user. As illustrated in FIG. 9, each block contains the data associated with each user. In this embodiment, the secure database 124 may be implemented and distributed over one or more servers 170 that may be part of a cloud computing environment 172. As those skilled in the art will appreciate, a Blockchain database is typically distributed over a large number of servers 170 that each contain an identical copy of the encrypted database.

The UE 132 can access the centralized secure database 124 through a licensed network, such as the base station 112, core network 116, and gateway 118, as described above with respect to the hub 102. Alternatively, the UE 132 may access the Blockchain version of the secure database 124 using unlicensed network, such a WiFi connection to the WAN 120.

The hub 102 can discover new compatible network appliances 104 through a network scan. The hub 102 stores encrypted device information in the local secure database 182 (see FIG. 5) for security and authentication. As described above the authentication process can be manually controlled by requiring the approval of any new components to the system 100 by the authenticated UEs 132 or automatically completed without human intervention if the new device is certified as ioXt compliant. The hub 102 initiates a pairing process with the new network appliance 104 once authentication and Blockchain based verification processes have been completed. The encrypted secure database 182 in the hub 102 is periodically shared with the remote Blockchain in the secure database 124 (see FIG. 9) so that the Blockchain database stored on the servers 170 have a complete and accurate list of all network appliances 104 coupled to each hub 102.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:
1. A system comprising:
a first secure control hub;
a cellular transceiver within the first secure control hub configured for communication with a cellular communication network;
a short-range transceiver within the first secure control hub configured for communication with other than the cellular communication network, the first secure control hub having a coverage range defined by a coverage range of the first secure control hub short-range transceiver;
a processor within the first secure control hub to control operations of the first secure control hub;
a user equipment (UE) operable by a user and having a short-range transceiver for communication with the first secure control hub;
a plurality of network appliances distributed throughout a facility, each of the plurality of network appliances having a short-range transceiver for communication with the first secure control hub and at least a first portion of the plurality of network appliances being within the coverage range of the first secure control hub short-range transceiver;
a data storage area contained within the first secure control hub and configured to store encrypted data related to the plurality of network appliances controlled by the first secure control hub wherein only the first secure control hub and the UE can decrypt the stored encrypted data;
wherein the first secure control hub and the first portion of the network appliances form an intranet network via the respective short-range transceivers;
wherein the first secure control hub authenticates the UE and the plurality of network appliances controlled using commands generated by the first secure control hub, the first secure control hub being further configured to generate a certificate for each of the plurality of network appliances controlled by the first secure control hub to permit secure communication between the first secure control hub and each respective one of the plurality of network appliances;
wherein the first secure control hub processor uses the stored encrypted data to generate an encrypted command message to a selected one of the plurality of network appliances to thereby control the selected one of the plurality of plurality of network appliances and to control the first secure control hub short-range transceiver to transmit the command message;
wherein the first portion of the network appliances are configured to receive the command message from the first secure control hub via the respective short-range transceivers, but only the selected one of the plurality of network appliances to whom the command message is directed can use the certificate generated by the first secure control hub to thereby decrypt the command message and process the decrypted command message generated by the first secure control hub; and
wherein all communication with the Internet occurs via the first secure control hub cellular transceiver so that none of the plurality of network appliances can communicate directly with the Internet.

2. The system of claim 1 the first portion of the plurality of network appliances comprises all of the plurality of network appliances.

3. The system of claim 1 wherein the coverage range of the first secure control hub short-range transceiver does not extend throughout the facility, the system further comprising:
a second secure control hub having a short-range transceiver with a coverage range within the coverage range of the first secure control hub short-range transceiver to permit radio communication between the first and second secure control hubs; and
a processor within the second secure control hub to control operations of the second secure control hub;
wherein the second secure control hub processor is configured to receive the encrypted command message transmitted from the first secure control hub short-range transceiver and to retransmit the received command message using the second secure control hub short-range transceiver; and wherein only the selected one of the plurality of network appliances to whom the command message is directed can decrypt the command message and process the decrypted command message received from the second secure control hub.

4. The system of claim 3, further comprising a cellular transceiver within the second secure control hub configured for communication with the cellular communication network, wherein the second secure control hub can communicate directly with the cellular communication network independently of the first secure control hub.

5. The system of claim 3 wherein the second secure control hub is configured for communication with the cellular communication network only via the first secure control hub cellular transceiver.

6. The system of claim 1 wherein the coverage range of the first secure control hub short-range transceiver does not extend throughout the facility, wherein at least the first portion of the plurality of network appliances are configured as nodes in a mesh network with the first secure control hub, the nodes being configured to receive the command message from the first secure control hub via the respective short-range transceivers and to retransmit the received command message using the respective short-range transceivers when the command message is directed to network appliances other than the selected one of the plurality of network appliances;

wherein the selected one of the plurality of network appliances to whom the command message is directed is configured to decrypt the command message and process the decrypted command message.

7. The system of claim 1 wherein each of the plurality of network appliances is configured in a manner that prevents any direct communication from any of the plurality of network appliances outside the intranet network.

8. The system of claim 1 wherein the UE is configured to communicate with the first secure control hub using the short-range transceiver and to generate a command for a selected of the plurality of network devices.

9. The system of claim 1, further comprising a Blockchain data storage area configured to store a copy of the data stored within the data storage area of the first secure control hub.

10. The system of claim 9 wherein the Blockchain data storage area is stored within a plurality of distributed data storage areas remote from the first secure control hub.

11. The system of claim 1 further comprising a Blockchain data storage area stored locally within a storage area of the first secure control hub as a single block, the system further comprising a plurality of distributed data storage areas remote from the first secure control hub and configured to store a plurality of data blocks as a Blockchain.

12. The system of claim 1 wherein the cellular transceiver in the first secure control hub is configured as a picocell and communicates with a base station of the cellular communication network via a wireless cellular communication link.

13. The system of claim 12 wherein the first secure control hub processor determines a measure of signal quality of the wireless cellular communication link and adjusts an amplification level of a receive portion of the first secure control hub cellular transceiver based on the signal quality measure and adjusts a transmit power level of a transmit portion of the first secure control hub cellular transceiver based on the signal quality measure.

14. The system of claim 1 wherein the first secure control hub processor determines a measure of signal quality of a wireless communication link between the first secure control hub short-range transceiver and the short-range transceiver of at least one of the plurality of network appliances and adjusts an amplification level of a receive portion of the first secure control hub short-range transceiver based on the signal quality measure and adjusts a transmit power level of a transmit portion of the first hub short-range transceiver based on the signal quality measure.

15. The system of claim 1 wherein the short-range transceiver is configured for operation in accordance with IEEE 802.11 standards.

* * * * *